UNITED STATES PATENT OFFICE.

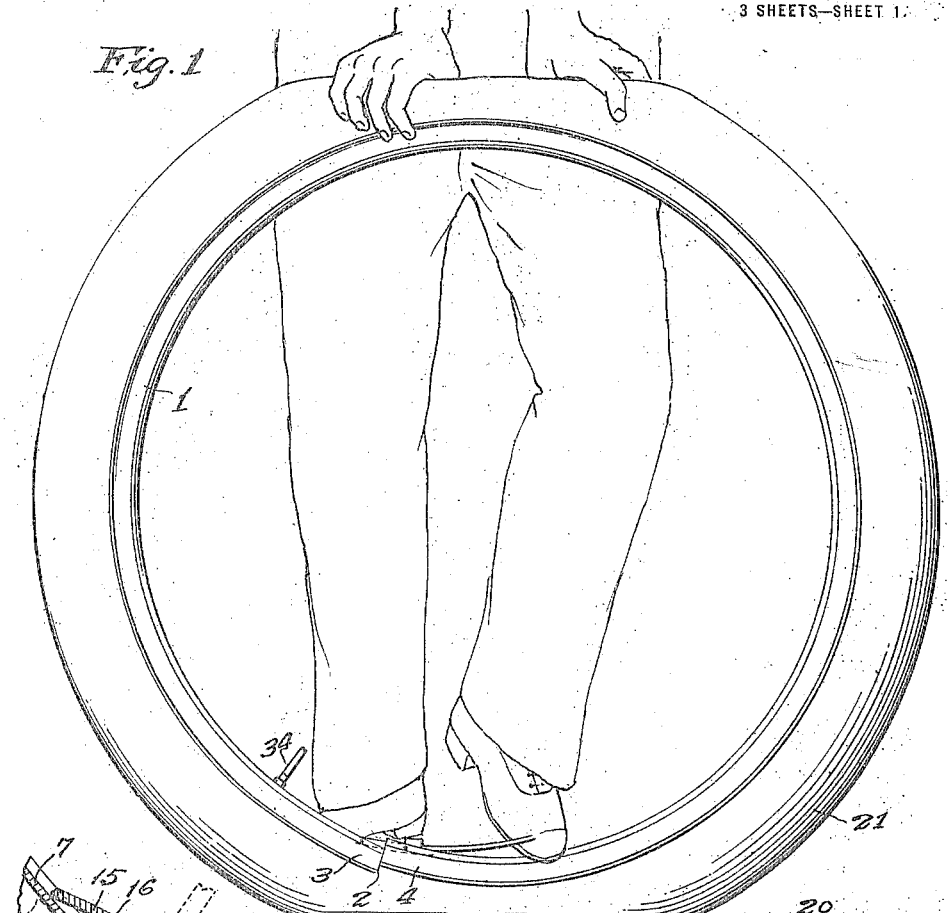

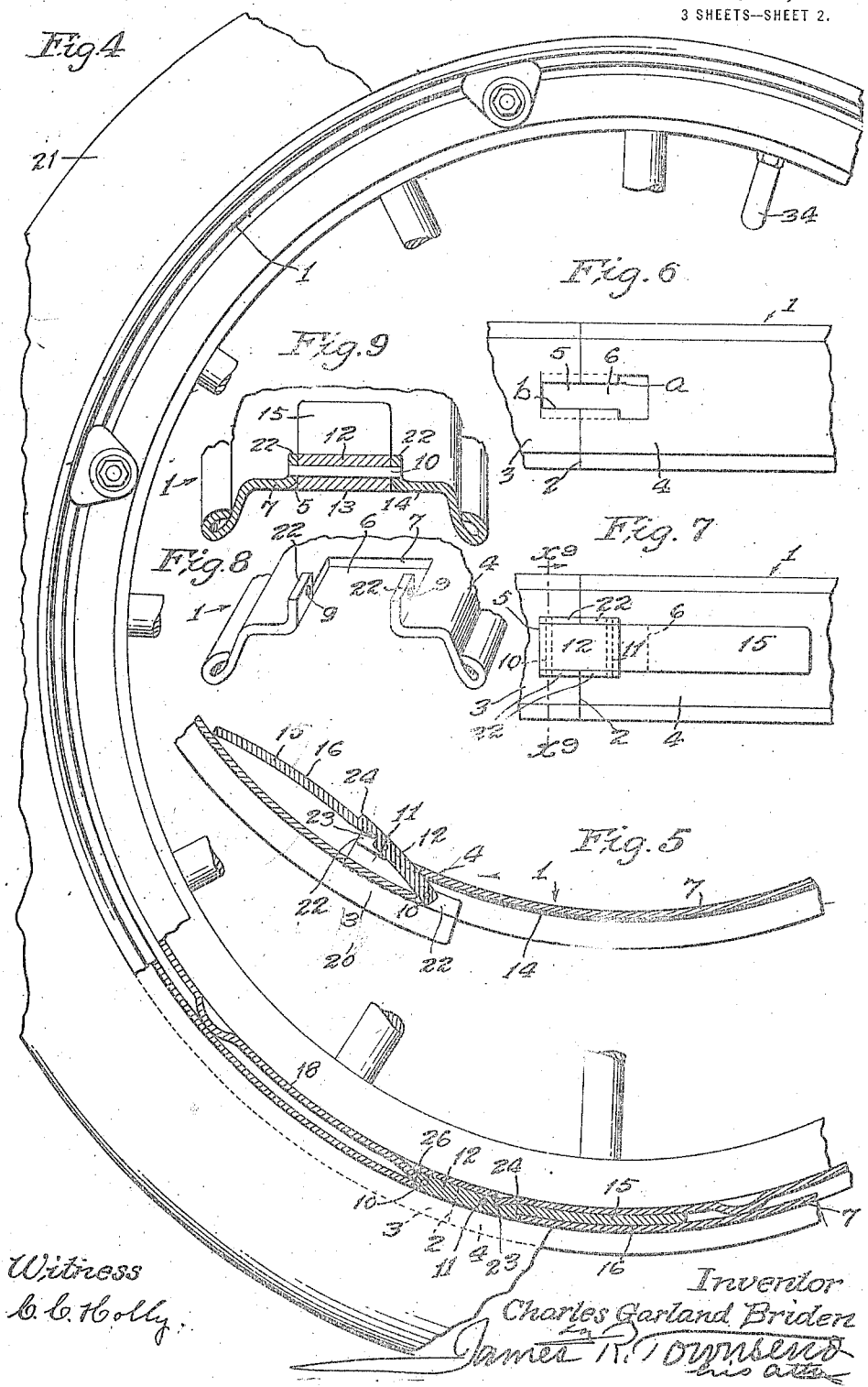

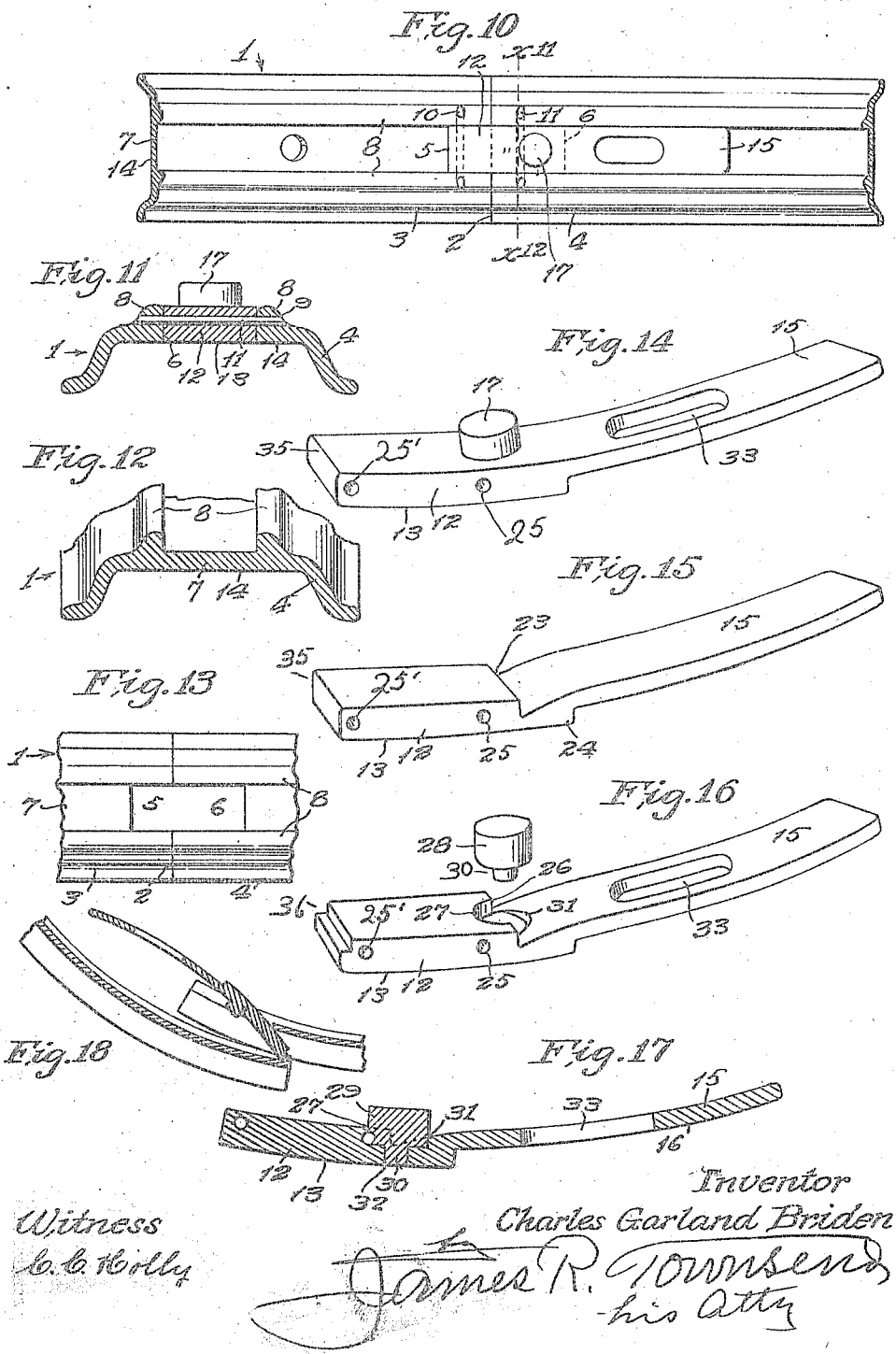

CHARLES GARLAND BRIDEN, OF LOS ANGELES, CALIFORNIA, ASSIGNOR OF ONE-HALF TO HOMER LAUGHLIN, JR., OF LOS ANGELES, CALIFORNIA.

DEMOUNTABLE TIRE RIM.

1,416,940.                  Specification of Letters Patent.     Patented May 23, 1922.

Application filed February 18, 1919. Serial No. 277,879.

*To all whom it may concern:*

Be it known that I, CHARLES GARLAND BRIDEN, a citizen of the United States, residing at 1752½ North Vermont Avenue, in the city of Los Angeles, county of Los Angeles, and State of California, have invented a new and useful Improvement in Demountable Tire Rims, of which the following is a specification.

The invention is an improvement upon a demountable tire rim described and claimed in my co-pending application Serial No. 256,613, filed Oct. 1, 1918, and an object of this invention is to attain with greater perfection certain objects aimed at in said former application.

Another object is to provide an improved element which will be acceptable to the trade as an accessory to be carried in stock as a separate unit and is so constructed that it may be adapted by slight changes, which may be made in any ordinary well equipped machine shop, to fit different kinds of demountable tire rims.

Another object is to provide for constructing a demountable rim of the open ring type with a minimum number of parts. A feature of the invention in this respect is the construction of the open ring rim in such a manner as to allow direct seating of the pins which carry the locking and unlocking lever.

In this invention I so construct the open ring rim that portions of the rim body are adapted to seat the lever fulcrum pins directly.

An object is to provide an open ring rim and lever combination that will be cheap and simple, and that is applicable to prevent rim slippage on the felly.

Another object is to make provision whereby the rim may be collapsed to a maximum extent with a minimum stress and strain on the rim and with minimized effort on the part of the operator.

The invention includes novel parts and combinations of parts which go to make up the means for connecting the tire to the felly.

Other objects, advantages and features of novelty may appear from the accompanying drawings, the subjoined detail description and the appended claims.

The accompanying drawings illustrate the invention as the same is applied in various makes and forms of demountable tire rims.

Figure 1 is an elevation showing my improvement in one of its forms during the operation of collapsing the rim to remove a tire which is shown deflated for that purpose.

Fig. 2 is an enlarged mid-plane sectional elevation of the rim shown in Fig. 1, with parts in pocked collapsed position.

Fig. 3 is a fragmental view on the scale of Fig. 2 showing a wheel in mid-plane section with rim and inflated tire in place.

Fig. 4 is a fragmental view of a wheel with inflated tire in place on a demountable rim constructed in accordance with this invention in another form. The lever and adjacent parts are shown in mid-plane longitudinal section.

Fig. 5 is a fragmental mid-plane section of the rim ends and lever and cooperating parts shown in Fig. 4.

Fig. 6 is a fragmental view of the inner side of the rim ends stamped ready to be bent up preparatory to applying the lever unit.

Fig. 7 is a fragmental inside view of the rim ends shown in Fig. 6 as they appear when completed with lever in place and locked to expand the rim.

Fig. 8 is a perspective view of one end of the rim shown in Fig. 6 with the ears bent up and bored preparatory to the reception of the lever therefor.

Fig. 9 is a fragmental transverse section on line $x^9$. Fig. 7.

Fig. 10 is a fragmental inside view of another form of rim to which this invention has been applied.

Fig. 11 is a transverse section on the line $x^{11}$—$x^{12}$ Fig. 10.

Fig. 12 is a fragmental transverse section on line indicated at $x^{11}$—$x^{12}$ Fig. 10, prior to stamping and boring.

Fig. 13 is an inside plan of the collapsible rim joint after stamping and before boring showing the slotted meeting ends of the rim.

Fig. 14 is a perspective view of one form of the lever unit bored to receive the hinge pins.

Fig. 15 is a perspective view of another form of the lever.

Fig. 16 is a perspective view of a form of the lever unit which is capable of use not only in the form shown in Fig. 15 but is particularly adapted to be changed by slight machine operations and by the addition of a stud, to the form shown in Fig. 14. The stud is shown detached.

Fig. 17 is a longitudinal midsection of the form shown in Fig. 16 as the same has been changed and added to, to form, out of a lever practically conforming to that shown in Fig. 15, a lever conforming to that shown in Fig. 14.

Fig. 18 is a fragmental sectional detail showing in collapsed position, the lever and meeting ends of a demountable tire rim in which the lever is pivoted directly to the material of a rim band, only one end of which is slotted.

The spring metal band 1, is transversely divided at 2 to form the separate ends 3, 4, of an open ring forming the rim body. Slots 5, 6, corresponding in width are formed in the band ends. The first slot 5 in the first end is of less length than the second slot 6 in the second end. Said slots are stamped or cut in the web 7 of the band and are between projections 8 that are formed integral with the rim ends, and that are pierced with pintle holes 9 to receive pins 10, 11, that extend transversely of the slots and of the band.

The lever comprises a thickened portion 12 conforming to the conjoined slots when the rim is expanded, the outer face 13 of the thicker portion also conforming to the outer face 14 of the web 7 when the rim is expanded.

The lever is provided with a handle 15 of the same width as the thickened portion 11 and which projects from the inner end of the thickened portion and conforms on its outer face 16 to the inner face of the web 7. The first pin 10 extends through the thickened portion 12 of the lever near the end of the lever and through the inward projections of the rim at the inner end of the first slot 5. The pintle 11 extends through the thickened portion 12 at a distance from the outer end thereof about equal to twice the length of the slot 5.

The two pintles 10 and 11 are about equidistant from the joint 2 where the two rim ends come together when the rim is expanded. The second pin is at a greater distance from the inner end of the second slot than from the outer end of the second slot, and is spaced from the inner end of the thickened portion a distance about equal to the distance from said pintle to the inner end of the second slot so that the rim may be contracted as shown in Fig. 2 with the lever caught by and between both slot ends. A boss 17 is formed on the inner side of said lever to engage the felly band 18 which is shown as provided with a hole 19 for such engagement when the rim is expanded and is seated on the felly band.

The handle 15 is made somewhat longer than the thickened portion 12 of the lever and is adapted to rest as a stop against the outer lap 3 as seen in Fig. 2, when the rim is contracted practically to its fullest extent and when the rim ends are lapped close together and practically nested one within the other.

By bringing the rim ends close together as shown in Fig. 2 the band is contracted to exert force in two directions, one of said forces tending to draw the terminals of the band to the contracted position and the other tending to extend the inner terminal tangentially to press against the outer terminal. These two forces exerted on the thickened portion through the medium of the pintles, locks the band from springing out of its contracted position; and contrariwise, when the lever is swung in to bring the thinner portion of handle 15 against the inside of the rim, the spring tendency of the band holds the lever in position with the outer side of the thickened portion conformed to the outside of the slotted web.

By the arrangement and construction shown, however, it is made practicable when the rim is free from the felly band, to break the joint 2 of the expanded rim by placing the second end 4 of the rim in downward position above a support as the floor 20, and then by pressing down on the top of the rim as indicated by the operator's hands in Fig. 1, the breaking of the joint will cause the inner free end or handle 15 of the lever to lift away from the band whereupon the operator may by foot or hand draw the free end or handle of the lever away from the inner end 4 and may swing said handle over into the rim contracted position with the ends closely lapped as shown in Fig. 2, thus fully collapsing the rim; whereupon it may be removed from within the tire 21.

In the form shown in Figs. 4-9 the parallel projections 22 are formed by bending in from the web, portions $a$, $b$ which are severed from the web at their inner edges at both ends and terminates at their outer ends with the web. In Fig. 6 the portions $a$, $b$ are shown as flat extensions of the web. The same are shown bent up in the other views, to form the hinge pin seats 22.

In Figs. 4, 5, and 15 I have shown levers provided with a notch 23 on the inside of the lever extending toward the outside of the thickened portion intermediate the inner end 24 of the thickened portion and the pintle hole 25, at such inner end. The purpose of this notch is to provide a shoulder at 24 on the concave side of the lever to engage the corresponding shoulder 26 on the outer face of the felly band 18 when the rim is expanded and seated thereon. The levers may be drop forged or otherwise formed and the pin holes 25, 25' bored as required.

The lever shown in Fig. 16 is constructed to be of universal application to a variety of standard demountable rims.

This form of lever is provided with a notch corresponding to the notch 23 above described and having its shoulder 23' formed by the abrupt end of said notch, provided with a recess 27 adapted to seat a stud 28 corresponding to the boss 17 shown in Figs. 2, 3 and 14 for the purpose of engaging a hole 19 in the felly band 18. In this form of lever a stud 29 shown in Fig. 17 is provided with a stem 30 which may be secured in the lever by forming therein a seat 31 for the stud, and a hole 32 bored from said seat through the lever to accommodate said stem which may be secured therein by riveting.

To apply this invention to closed ring rims, such rims may be cut transversely and stamped and bent to form the slots and pintle seats.

In Figs. 14, 16, 17, there is shown an oblong opening 33 in the handle of the lever unit to allow for the clearance of the valve stem 34 when the lever is applied to such type of rim as has the valve stem opening in close proximity to the transverse division of such rim.

There is at present a large number of open ring demountable tire rims in which the transverse cut is made so close to the hole for the valve stem of the tire, that if the lever were made to turn toward such valve stem for expanding the rim, said valve stem would intercept the lever before it reached its closed position on the rim, and if such lever is provided with a hole to accommodate the valve stem it is necessary to make the lever so long that it will not lock in rim collapsed position on account of contact with the collapsed band.

I overcome this difficulty by hinging the heel 35 of the lever to that end of that open ring rim band which is pierced with the valve stem hole, and providing the lever with the elongate slot 33 to accommodate the valve stem when the lever is turned into rim collapsing position.

It is desirable that the lever be as short as possible with due regard to the requisite leverage for collapsing the rim and in this device the heel of the lever is pivoted to that end of the rim which is provided with the valve stem hole and with the shorter slot. By this arrangement of the slotted lever it is made possible to equip with this invention all manufactured rims of the description specified, and to do this at a comparatively slight expense.

A feature of this invention, therefore lies in the specific construction and arrangement just specified.

In Fig. 16 a notch 36 is provided in the inner side of the terminal of the thickened portion to adapt the lever to fit the felly band in certain types as shown in Fig. 4 in which the thickened portion of the lever acts as a stop or lock in accordance with the opening provided for such purpose in the felly band.

An object is to conform the thickened portion of the lever to the opening in the felly band so as to give the lever a complete throw to nest the lapped ends together when the rim is collapsed.

I claim:

1. An open ring demountable tire rim slotted at both ends and provided near the inner end of one slot and at about equidistance from the outer end of the other slot with pintle holes in the body of said rim; pins in said pintle holes and extending transversely of the slots; and a lever having a thickened portion pivoted on said pins respectively; said thickened portion being practically equal in length to the length of both slots and filling the open spaces formed by said slots and having a concave face conforming to the curvature of said rim when the rim is expanded; said lever terminating in a handle having about the same length as the thickened portion so that when the handle is turned into collapsible position the ends of the rim may be lapped close to each other.

2. A demountable tire rim of the open ring type provided at its ends with slots and with parallel projections at the sides of said slots formed by bending up inward extensions of the material of said rim; a lever having at one end a thickened portion; the outer face of which conforms to the curvature of the outer face of the expanded rim; said thickened portion conforming to the slots to close the same when its outer face is flush with the outer face of the rim; a pintle extending through the thickened portion at one end of the lever and through the extensions of the rim at the sides of one of said slots; and a pin extending through the thickened portion of the lever at a distance from the first mentioned pin and extending through the extensions at the sides of the slot at the other end of said rim.

3. An open ring tire rim comprising a band having both ends provided with slots, one of which is longer than the other; a lever having a thickened portion fitting the combined slots and pivoted at one end to the band near the closed end of the shorter slot and pivoted intermediately to the band between the ends of the longer slot; said lever being provided with a thinner portion of the same width as the thickened portion and which extends across the closed end of the longer slot and laps over the inner face of the second end of the expanded band.

4. A demountable tire rim comprising an open ring spring band having slots at both ends; a lever working in said slots and provided with a handle adapted to bring the band ends in lapped position; the slot of the inner lapped end being of greater length than the slot of the outer lapped end for the purpose of allowing the lever to be swung over sufficiently to cause the resiliency of the band to force the end of the lever against the inside of the band so as to hold the rim locked in contracted form.

5. The combination with a transversely divided slotted spring demountable rim band, slotted at both ends, of a lever having a thickened portion pivoted in the slots and a handle adapted to rest as a stop against the outer lap when the rim is contracted to its fullest extent.

6. A demountable rim comprising a spring band divided transversely and slotted at both ends and having portions of the side walls of said slots turned inward to form pintle seats; and a lever pivoted in said slots by pins extending through said seats.

7. In a demountable rim a transversely divided spring band slotted at both ends and having the edges of the slots turned inward to form pintle seats.

In testimony whereof, I have hereunto set my hand at Los Angeles, California, this 30th day of December, 1918.

CHARLES GARLAND BRIDEN.

Witness:
JAMES R. TOWNSEND.